United States Patent
Jira et al.

(10) Patent No.: US 8,136,138 B2
(45) Date of Patent: Mar. 13, 2012

(54) DISPLAY REPLICATION AND CONTROL OF A PORTABLE DEVICE VIA A WIRELESS INTERFACE IN AN AUTOMOBILE

(75) Inventors: Joseph C. Jira, Canton, MI (US); Dana B. Fecher, Farmington Hills, MI (US); Michael J. Andrews, Plymouth, MI (US); Theodore C. Wingrove, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1048 days.

(21) Appl. No.: 11/304,239

(22) Filed: Dec. 15, 2005

(65) Prior Publication Data

US 2007/0143798 A1    Jun. 21, 2007

(51) Int. Cl.
*H04N 7/18* (2006.01)

(52) U.S. Cl. .............................. 725/75; 725/62; 725/81
(58) Field of Classification Search .................... 725/75, 725/62, 81
See application file for complete search history.

(56) References Cited

U.S. PATENT DOCUMENTS

| | | | |
|---|---|---|---|
| 6,219,744 B1* | 4/2001 | Bredin et al. ................. 710/262 |
| 6,452,597 B1 | 9/2002 | Goldberg et al. | |
| 6,678,892 B1* | 1/2004 | Lavelle et al. .................. 725/75 |
| 7,277,671 B2* | 10/2007 | Glass et al. .................. 455/2.01 |
| 7,774,232 B2* | 8/2010 | Pfleging et al. ................. 705/16 |
| 2002/0173333 A1* | 11/2002 | Buchholz et al. ............. 455/527 |
| 2002/0174427 A1* | 11/2002 | Kohno et al. .................... 725/30 |
| 2003/0017846 A1 | 1/2003 | Estevez et al. | |
| 2004/0049797 A1* | 3/2004 | Salmonsen .................... 725/132 |
| 2004/0209655 A1* | 10/2004 | Kubo .......................... 455/569.1 |
| 2004/0224638 A1* | 11/2004 | Fadell et al. ................. 455/66.1 |
| 2005/0005298 A1* | 1/2005 | Tranchina ....................... 725/81 |
| 2005/0044564 A1* | 2/2005 | Stopniewicz et al. ........... 725/37 |
| 2005/0050579 A1* | 3/2005 | Dietz et al. .................... 725/143 |
| 2005/0062695 A1 | 3/2005 | Cok | |
| 2006/0017550 A1* | 1/2006 | Yoshida et al. .......... 340/426.11 |
| 2006/0046788 A1* | 3/2006 | Oh .............................. 455/569.1 |
| 2006/0064730 A1* | 3/2006 | Rael et al. ........................ 725/95 |
| 2007/0049197 A1* | 3/2007 | Klein ........................... 455/41.2 |
| 2007/0149247 A1* | 6/2007 | Wong ............................ 455/557 |
| 2007/0300002 A1* | 12/2007 | Burnham et al. ............. 710/303 |

OTHER PUBLICATIONS

German Office Action Dated Apr. 3, 2009.

* cited by examiner

*Primary Examiner* — Pankaj Kumar
*Assistant Examiner* — Mulugeta Mengesha
(74) *Attorney, Agent, or Firm* — Brinks Hofer Gilson & Lione

(57) ABSTRACT

A system for displaying video data in a vehicle. The system intelligently replicates one or more portable device displays on one or more vehicle displays. Each vehicle display may be shared or dedicated to a specific portable device. The image from each portable device is intelligently replicated and provided to the vehicle integrated video system via a wireless communication link for display. The wireless communication link can provide the image to the vehicle integrated video system in real time to support both static images and dynamic images.

20 Claims, 3 Drawing Sheets ated display (for example 64 k) and the number of available
DISPLAY REPLICATION AND CONTROL OF A PORTABLE DEVICE VIA A WIRELESS INTERFACE IN AN AUTOMOBILE

BACKGROUND

1. Field of the Invention

The present invention generally relates to a system for displaying video data in a vehicle.

2. Description of Related Art

The consumer electronic market grows and develops new products at a rate much faster than the automotive OEM and suppliers can integrate the functionality to support such products. Accordingly, OEMs are trying to address the gap in technology by providing wired interfaces to some consumer electronic devices such as compressed audio players, or wireless interfaces to communication devices such as cellular phones. These interfaces generally provide connectivity, control, and status information over the communication link. This addresses the basic need for connectivity and control of the portable device. However, an entirely new, and typically custom user interface must be designed to support the portable device. That user interface may or may not be similar to the interface for the portable device. Accordingly, such interfaces require significant development effort and are often only developed for a very limited number of the available consumer electronic devices.

In view of the above, it is apparent that there exists a need for an improved system for displaying video data in a vehicle.

SUMMARY

In satisfying the above need, as well as overcoming the enumerated drawbacks and other limitations of the related art, the present invention provides an improved system for displaying video data in a vehicle. The system intelligently replicates one or more portable device displays on one or more vehicle displays. Each vehicle display may be shared or dedicated to a specific portable device. The image from each portable device is intelligently replicated and provided to the vehicle integrated video system via a wireless communication link for display. The intelligent replication allows the image to be optimized for in-vehicle display. Accordingly, the image may be optimized by resizing of the image, resampling of the image, color shifting of the image, or changing the aspect ratio of the image. The wireless communication link can provide the image to the vehicle integrated video system in real time to support both static images and dynamic images. Accordingly, portable electronic devices such as phones, PDAs, compressed media players including MP3 and MPEG players, as well as portable navigation systems may be supported.

Further objects, features and advantages of this invention will become readily apparent to persons skilled in the art after a review of the following description, with reference to the drawings and claims that are appended to and form a part of this specification.

DETAILED DESCRIPTION

Figure 1:
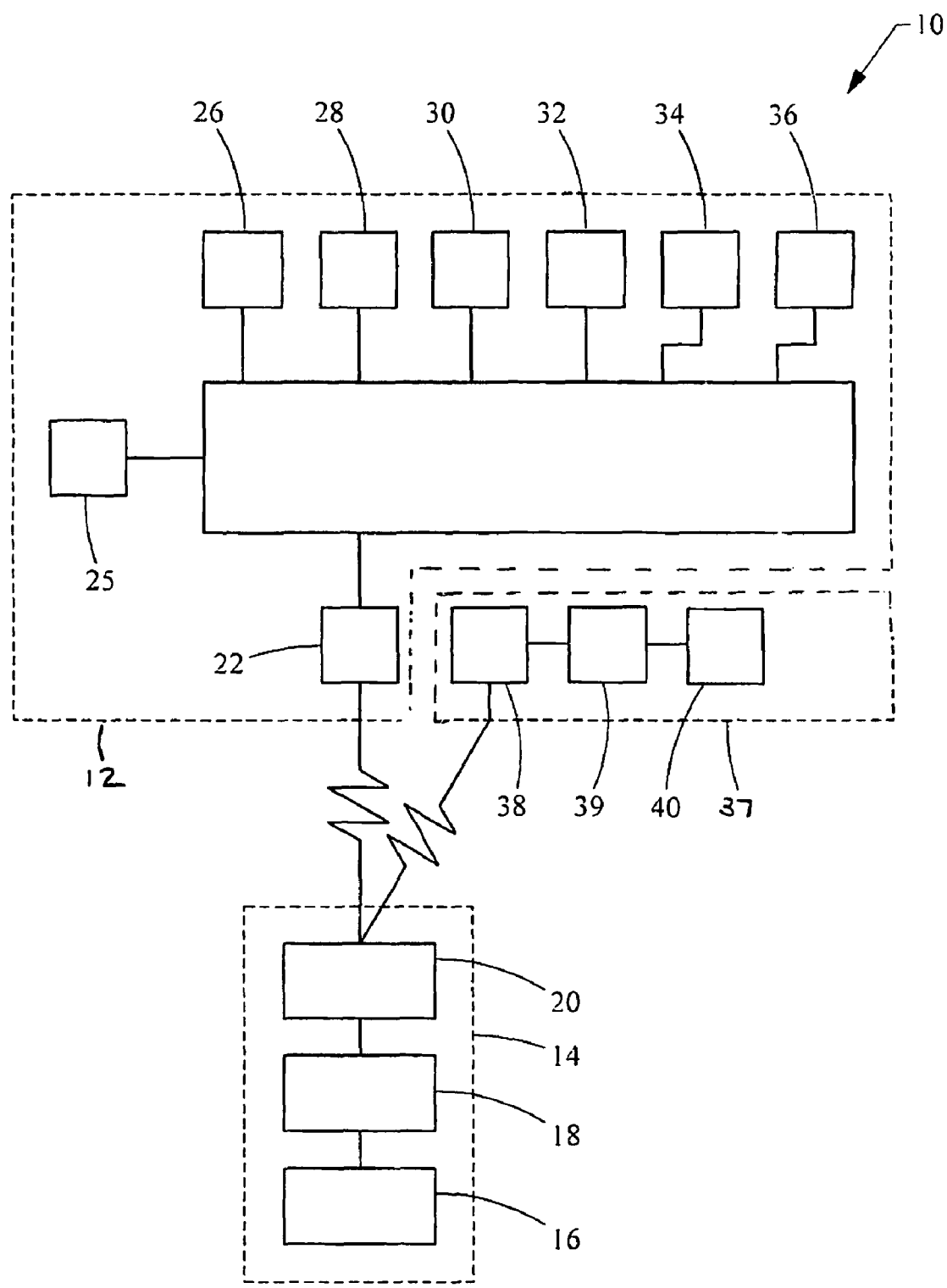
FIG. 1 is a block diagram of a system for displaying video data from a portable device in a vehicle in accordance with one embodiment of the present invention.
Figure 2:
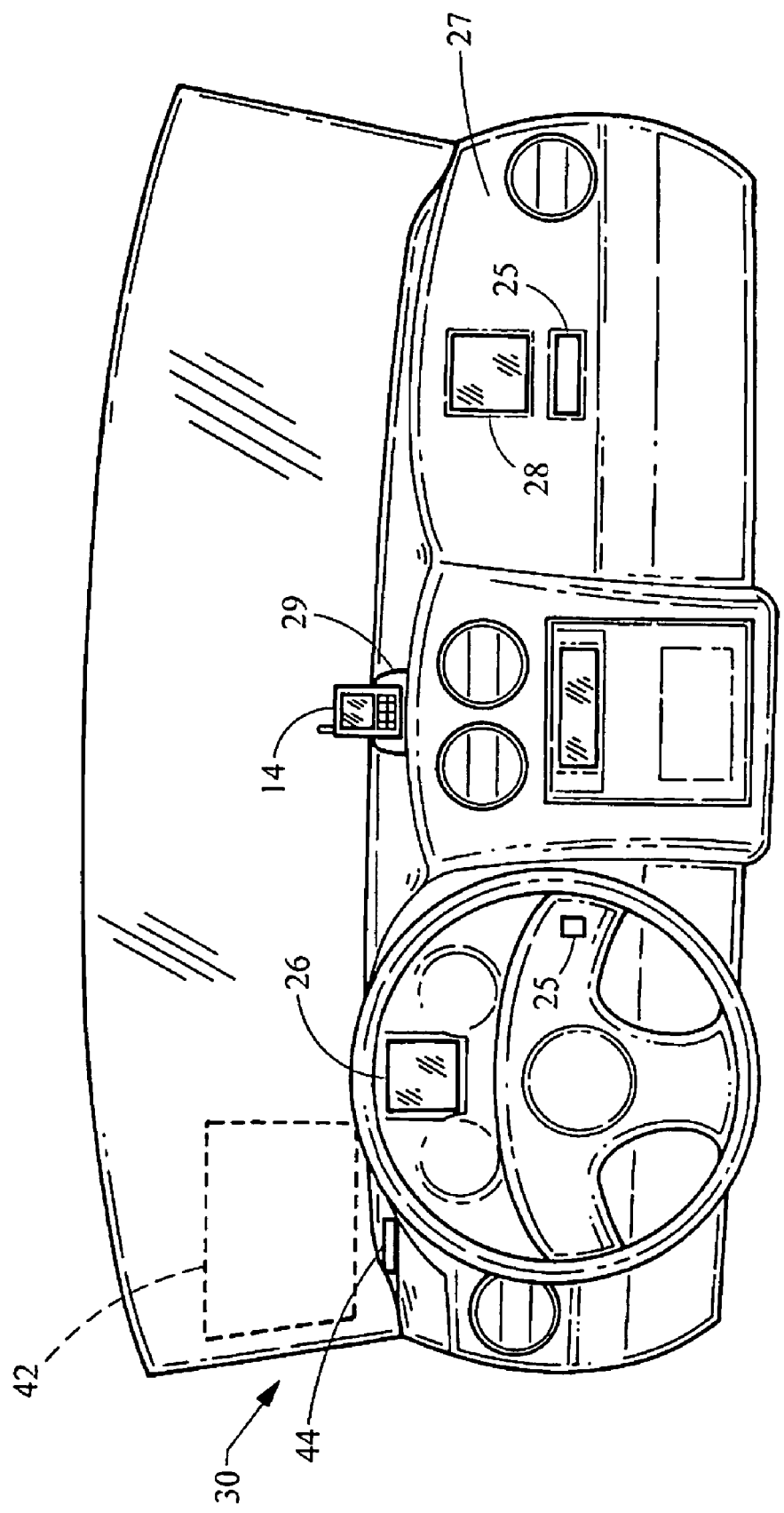
FIG. 2 is a perspective view of the dashboard and instrument cluster of a vehicle.

Referring now to FIGS. 1 and 2, a system embodying the principles of the present invention is illustrated therein and designated at 10. The system 10 includes a vehicle integrated video system 12 and a portable electronic device 14. The portable electronic device 14 includes a device display 16, a device controller 18, and a wireless transmitter 20. The controller 18 provides control over the functionality of the portable electronic device 14 and is in electronic communication with the device display 16 to provide video output such as bitmap, mpeg, or rasterized format containing primarily pixel data. The video output may be in the form of a video entertainment signal, such as a live or recorded video image, or for control purposes, such as a graphical menu. The device controller 18 replicates the video output and provides it to the wireless transmitter 20 allowing the replicated video data to be provided to the vehicle integrated video system 12. Accordingly, the portable electronic device 14 may take the form of a personal digital assistant (PDA), a phone, a compressed media player, a portable navigation system, or other similar device.

The video data is received by a wireless receiver 22 in the vehicle integrated video system 12. The vehicle integrated video system may be part of a larger vehicle subsystem, for example a vehicle entertainment system or an instrument cluster. As such, the transmitter 20 and receiver 22 may be configured to communicate across various wireless protocols. For example, the transmitter 20 and receiver 22 may communicate via a radio frequency transmission such as IEEE 802.11 or Bluetooth. In addition, the wireless communication may be an infrared protocol such as IrDA. Although other commonly known communication protocols may be used or specialized interfaces develop. The receiver 22 provides the video data to the vehicle controller 24. The vehicle controller 24 uses the video data to intelligently replicate the image provided to the device display 16. In addition, the vehicle controller 24 may be configured to continuously scan for portable devices over the wireless communication link. Accordingly, the vehicle controller 24 initiates communication with the portable device 14 based on an interrupt request, a polling routine, or similar technique.

The vehicle controller 24 is configured to optimize the image for rendering on a vehicle display 26, for example by resizing the image, resampling the image, color shifting the image, or changing the images aspect ratio. Resizing the image may include making the image larger or smaller by adding content to the outside of the image or deleting content from the image. Resampling the image may include systematically adding or removing content throughout the image. Resampling is typically done proportionally throughout the image, for example, by removing every other column and every other row to reduce the size of the image. Alternatively, a column and a row may be added at regular intervals to add content to the image. However, rows and columns may be doubled, averaged, or interpolated between adjacent rows and columns to add content and artificially increase the resolution of the image.

Color shifting includes changing specific colors in the original image by mapping them to different colors in the output image. This may be done where there is a difference between the number of available colors on the vehicle integrated display (for example 64 k) and the number of available colors on the portable device (for example 16 colors). In addition, this may also be used to tone the color of the video output, such as a control menu, to match the color of proximately located controls and displays, for example if the vehicle display is integrated into the instrument cluster. Accordingly, if all of the text in the original image was blue, blue may be mapped to red in the output image to provide red text for the vehicle display. Further, the image aspect ratio may be changed, for example, by resampling the image non-uniformly by adding or subtracting content in the horizontal direction while leaving the vertical content constant causing an apparent stretching of the image. The wireless interface may also provide status and control information via the communication link to allow functional manipulation of the portable electronic device 14 by controls 25 in the vehicle integrated video system 12. Further, the video data may be provided in real time to support static displays such as photographs or menus, or dynamic displays such as navigation, video, or real time control.

The vehicle controller 24 is in electrical communication with a vehicle video display, such as vehicle display 26 located in the instrument cluster. The vehicle display 26 may include an LCD display and may be provided alongside other instruments within the instrument cluster for easy visibility by the driver. In addition, a control 25 may be provided on the steering wheel allowing the driver to manipulate the portable electronic device 14 via the communication link. The vehicle controller 24 is in electrical communication with another vehicle display 28 located on the dashboard 27 of the vehicle for easy viewing of the front seat passenger. Further, controls 25 may be provided on the dashboard in front of the passenger seat. Further, a docking cradle 29 may be provided for the portable electronic device 14 on the top of the dashboard. In addition, the vehicle controller 24 may be in electrical communication with a heads-up vehicle display 30 and including a projector 44 configured to project an image onto a portion 42 of the windshield for easy viewing by the driver of the vehicle.

Figure 3:
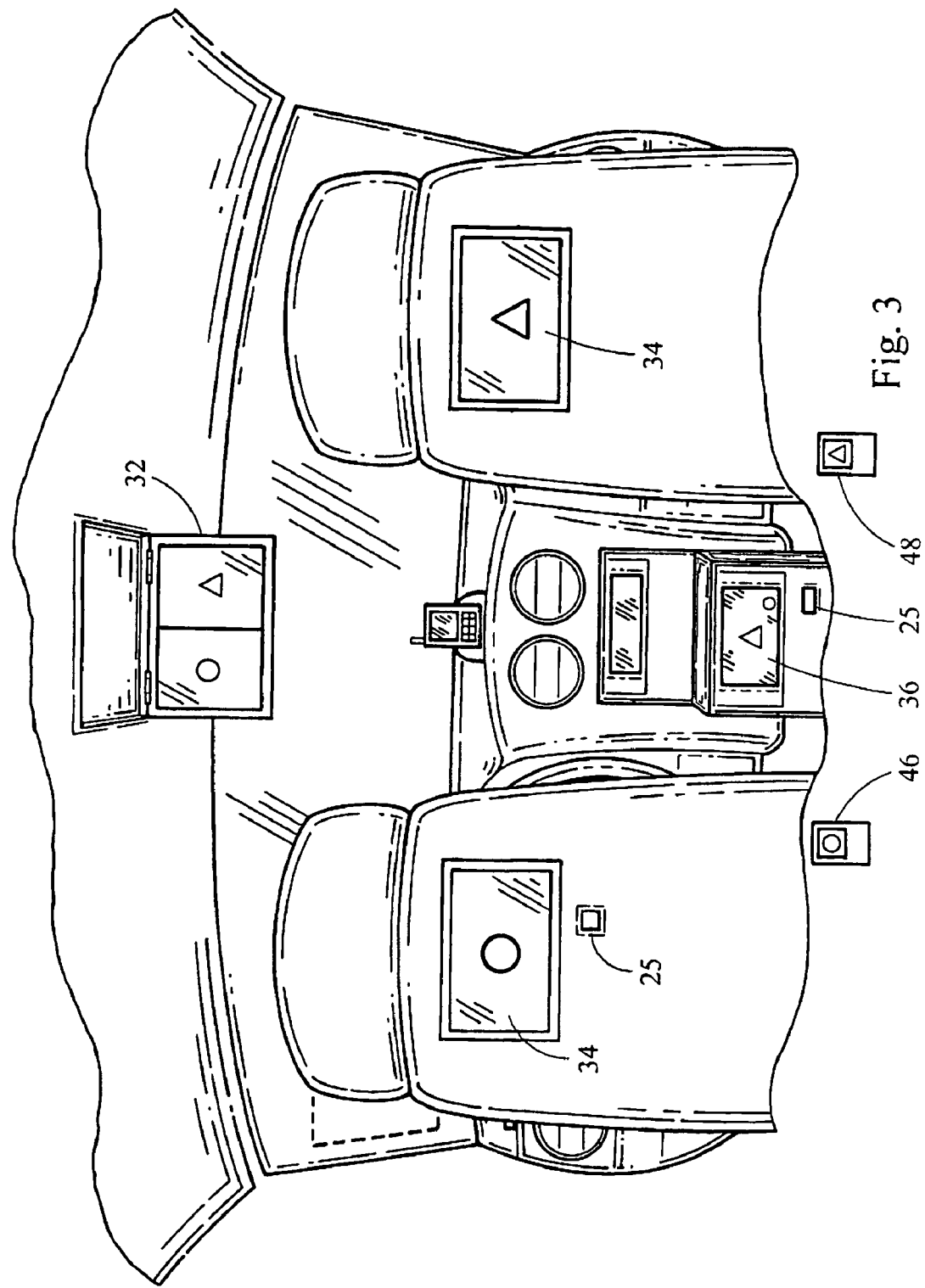
FIG. 3 is a perspective view of the front half of the passenger compartment of a vehicle.

Now also referring to FIG. 3, the vehicle controller 24 may be in electrical communication to a ceiling mounted vehicle display 32, such as an LCD display. The ceiling mounted vehicle display 32 may be one used for a vehicle entertainment system such as a DVD player or VCR player display. The ceiling mounted vehicle display 32 may be a flip down display allowing the display to be large enough to be used by either rear seat passenger and easily concealed when flipped up, parallel to the ceiling panel. In addition, the vehicle controller 24 may be in electrical communication with a vehicle display 34 mounted to the back of the front vehicle seat. In addition, vehicle controls 25 may be provided on the back of the front vehicle seat allowing the rear seat passenger to easily view the vehicle display 34 and manipulate the controls 25 from their seat in the rear of the vehicle. Yet another vehicle display 36 is in electrical communication with the vehicle controller 24 and mounted on a center console between the front vehicle seats. The vehicle display 36 may be a LCD display mounted statically in the middle console. Alternatively, the vehicle display 36 may be a flip-up or flip-down display to be easily concealed relative to the middle console. In addition, controls 25 may be provided on the middle console allowing easy manipulation of the portable electronic device 14 via the wireless communication link.

Each of the vehicle displays may be equipped with controls 25 that are configured to select which portable electronic device to receive the video data from to replicate the image on the device display. For example, each vehicle display may include a button, or other control, that may be used to index though each of the between each of the available portable electronic devices wirelessly communicating with the controller. In addition, the controller may be configured to render multiple images on a single display by separating the display into two sections. In one example, portable electronic device 46 and portable electronic device 48 are in electrical communication with one or multiple controllers within the vehicle. Portable electronic device 46 is shown as representatively displaying a circle, while portable electronic device 48 is shown as displaying a triangle. Accordingly, one vehicle display may replicate the image from portable electronic device 46 while another vehicle display may replicate the image from portable electronic device 48. Further, the vehicle controller 24 may be configured to replicate the image from one portable electronic device on one portion of the display and replicate the image from another portable electronic device on another portion of the vehicle display. One example is shown on vehicle display 32 where the image from portable electronic device 46 is replicated on one half of the vehicle display 32 and the image from portable electronic device 48 is replicated on the other half of the vehicle display 32. In another example, shown on vehicle display 36, one replicated image may be overlayed on top of another replicated image in a picture-in-picture format.

Referring again to FIG. 1 and as discussed above, the device controller may be in electrical communication with more than one vehicle controller, and more than one vehicle integrated video system. As such, the portable electronic device may also communicate wirelessly with vehicle integrated video system 37. Accordingly, the video data is received by vehicle receiver 38 and provided to vehicle controller 39. Vehicle controller 39 is in electrical communication with vehicle display 40, which may correspond to any of the aforementioned vehicle display types. Using multiple vehicle controllers can reduce the cost and complexity of intra-vehicle controller communication, also allowing wireless communication between the vehicle controllers.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A system for displaying video data in a vehicle, the system comprising:
 a portable electronic device including a device display, a device controller, and a wireless transmitter, the controller being configured to transmit the replicated video data corresponding to a replica of an image rendered on the device display;
 a first vehicle integrated video system including a first vehicle display, a first vehicle controller, and a first wireless receiver, the first vehicle controller receiving the replicated video data over a first wireless communication link between the portable electronic device and the first vehicle integrated video system, the first vehicle controller being in electrical communication with the first wireless receiver, and configured to retrieve the replicated video data from the first wireless receiver to render the replicated video data on the first vehicle display, wherein the first vehicle controller initiates communication with the portable electronic device; and
 a second vehicle integrated video system including a second vehicle display, a second vehicle controller, and a second wireless receiver, the second vehicle controller receiving the replicated video data over a second wireless communication link between the portable electronic device and the second vehicle integrated video system, the second vehicle controller being in electrical communication with the second wireless receiver, and configured to retrieve the replicated video data from the second wireless receiver to render the replicated video data on the second vehicle display, wherein the second vehicle controller initiates communication with the portable electronic device.

2. The system according to claim 1, wherein the wireless transmitter and the first wireless receiver communicate through an infrared communication link.

3. The system according to claim 1, wherein the wireless transmitter and the first wireless receiver communicate through a radio frequency communication link.

4. The system according to claim 1, wherein the first vehicle display is located in a vehicle instrument cluster.

5. The system according to claim 1, wherein the first vehicle display is mounted on the dashboard.

6. The system according to claim 1, wherein the first vehicle display comprises a heads-up display.

7. The system according to claim 1, wherein the first vehicle display comprises an overhead mounted video display.

8. The system according to claim 1, wherein the first vehicle display comprises a seat back mounted video display.

9. The system according to claim 1, wherein the first vehicle display is mounted to a middle console located between a pair of front vehicle seats.

10. The system according to claim 1, wherein the first vehicle display comprises a trunk mounted video display.

11. The system according to claim 1, wherein the first vehicle controller is configured to resize an image generated from the replicated video data for rendering on the first vehicle display.

12. The system according to claim 1, wherein the first vehicle controller is configured to resample an image generated from the replicated video data for rendering on the first vehicle display.

13. The system according to claim 1, wherein the first vehicle controller is configured to color shift an image generated from the replicated video data such that one color is mapped into another color for rendering on the first vehicle display.

14. The system according to claim 1, wherein the first vehicle controller is configured to change the aspect ratio of an image generated from the replicated video data for rendering on the first vehicle display.

15. The system according to claim 1, wherein the replicated video data is used to construct an image for rendering on the first vehicle display that is identical to the image rendered on the device display.

16. The system according to claim 1, wherein the portable electronic device comprised of a portable phone.

17. The system according to claim 1, wherein the portable electronic device comprised of a personal digital assistant.

18. The system according to claim 1, wherein the portable electronic device comprised of a compressed media player.

19. The system according to claim 1, wherein the portable electronic device comprises a portable navigation system.

20. The system according to claim 1, wherein the first vehicle controller is in communication with a plurality of portable electronic devices and configured to replicate an image from each of the portable electronic devices onto the first vehicle display.

* * * * *